(12) United States Patent
Fletcher et al.

(10) Patent No.: US 7,335,121 B2
(45) Date of Patent: Feb. 26, 2008

(54) BELT INSTALLATION TOOL

(75) Inventors: Barry Fletcher, Belle River (CA); Cornel Ureche, Sterling Heights, MI (US)

(73) Assignee: The Gates Corporation IP Law Dept., Denver, CO (US)

( * ) Notice: Subject to any disclaimer, the term of this patent is extended or adjusted under 35 U.S.C. 154(b) by 591 days.

(21) Appl. No.: 10/888,423

(22) Filed: Jul. 9, 2004

(65) Prior Publication Data

US 2006/0009322 A1   Jan. 12, 2006

(51) Int. Cl.
*F16H 7/24* (2006.01)
(52) U.S. Cl. ....................................... 474/130
(58) Field of Classification Search ................ 474/130
See application file for complete search history.

(56) References Cited

U.S. PATENT DOCUMENTS

| 478,260 | A |   | 7/1892 | Hammesfahr |         |
|---------|---|---|--------|------------|---------|
| 551,486 | A | * | 12/1895 | Brion, Jr. | 474/130 |
| 577,096 | A |   | 2/1897 | Zahniser |         |
| 588,838 | A | * | 8/1897 | Wade | 474/130 |
| 758,081 | A |   | 4/1904 | Kottusch |         |
| 798,238 | A |   | 8/1905 | Volkel |         |
| 2,195,359 | A |   | 3/1940 | Coe et al. | 74/242 |
| 2,499,173 | A |   | 2/1950 | Taylor | 74/242.7 |
| 2,572,789 | A |   | 10/1951 | Weikart et al. | 157/1 |
| 4,267,631 | A | * | 5/1981 | Chase | 29/426.1 |
| 6,402,649 | B1 |   | 6/2002 | Amkreutz | 474/130 |
| 6,692,391 | B2 |   | 2/2004 | Gerring et al. | 474/130 |
| 7,048,663 | B2 | * | 5/2006 | Riaudel | 474/130 |
| 2002/0107098 | A1 |   | 8/2002 | Amkreutz | 474/130 |
| 2003/0211910 | A1 |   | 11/2003 | Gerring et al. | 474/130 |

FOREIGN PATENT DOCUMENTS

| EP | 1 089 016 B1 | 12/2002 |
| WO | WO 02/36987 A1 | 4/2002 |
| WO | WO 03/078866 A1 | 9/2003 |

OTHER PUBLICATIONS

Ford Fitting Instructions, Instructions De Montageein-Bauanleitung, Istruzioni Di Montaggio, Instrucciones De Montaje Part No. XXXXXXXX, May 2001.

* cited by examiner

*Primary Examiner*—Vicky A. Johnson
(74) *Attorney, Agent, or Firm*—J. A. Thurnau, Esq.; C. H. Castleman, Esq.; J. L. Mahurin, Esq.

(57) ABSTRACT

A belt installation tool having a body and an angular member projecting from the body for engaging a pulley belt bearing surface. A surface disposed substantially normal to the angular member comprises a chamfered lip for engaging a pulley web feature. The lip and angular member removeably attach the tool to a pulley by flexure of the angular member.

12 Claims, 2 Drawing Sheets

BELT INSTALLATION TOOL

FIELD OF THE INVENTION

The invention relates to a belt installation tool, and more particularly, to a belt installation tool having an angular member for engaging a pulley rim and a cooperating chamfered lip for engaging a pulley web feature.

BACKGROUND OF THE INVENTION

Belt installation tools are used to install power transmission belts on belt drive system pulleys without the need to otherwise adjust a pulley center of rotation. The tools typically allow installation of a belt by rotating the pulley during which the belt is tracked or guided onto the pulley.

A tool is known having a bent member projecting from a side of an arcuate body. An edge of the arcuate body bears upon a pulley side when in use. The bent member engages a belt bearing surface. The tool is shown in Ford® "Fitting Instructions", frames 10, 11, 12, and 13, Part No. XXXXXXXX.

Also representative of the art is U.S. Pat. No. 2,499,173 to Taylor (1950) which discloses a guide device to be used for the application of an endless belt to a peripherally recessed sheave wheel.

What is needed is a belt installation tool having an angular member and cooperating lip for removeably attaching the tool to a pulley or damper. The present invention meets this need.

SUMMARY OF THE INVENTION

The primary aspect of the invention is to provide a belt installation tool having an angular member and cooperating lip for removebaly attaching the tool to a pulley or damper.

Other aspects of the invention will be pointed out or made obvious by the following description of the invention and the accompanying drawings.

The invention comprises a belt installation tool having a body and an angular member projecting from the body for engaging a pulley belt bearing surface. A surface disposed substantially normal to the angular member comprises a chamfered lip for engaging a pulley web feature. The lip and angular member removeably attach the tool to a pulley by flexure of the angular member.

BRIEF DESCRIPTION OF THE DRAWINGS

The accompanying drawings, which are incorporated in and form a part of the specification, illustrate preferred embodiments of the present invention, and together with a description, serve to explain the principles of the invention.

DETAILED DESCRIPTION OF THE PREFERRED EMBODIMENT

Figure 1:
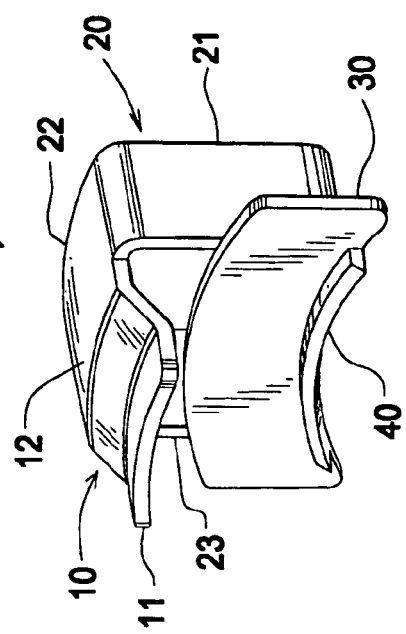
FIG. 1 is a perspective view of the tool.

FIG. 1 is a perspective view of the tool. Tool 100 comprises a body 20. Body 20 comprises a box-like form with sides 21, 22, 23, 24. This form is only an example of the forms that body 20 may have and is not meant to limit the form of the body.

Portion 10 mechanically engages a pulley or damper belt bearing surface. In a belt driven system, a belt may be engaged with pulleys or dampers. Portion 10 as an angular form that extends in a cantilever fashion from body 20. The cantilever aspect of portion 10 affords it a flexure characteristic for engaging a pulley or damper. Arcuate surface 11 is disposed at a radius with respect to a pulley or damper center of rotation (R1), that is less than a radius (R2) of arcuate surface 12, see FIG. 3. The cantilever aspect and the angular or "dogleg" shape of portion 10 allows the tool to positively inter-engage a pulley or damper belt bearing surface or rim, thereby assuring a non-slip mechanical connection.

Planar member 30 is connected to a side of body 20. Planar member 30 has a surface 31 that is disposed substantially normal to surface 12 of side 22. Surface 31 of planar member 30 engages a pulley or damper web feature, thereby stabilizing the tool during use, see FIG. 7.

The web feature may comprise that portion of a damper which contains an elastomeric damping material. Dampers comprise elastomeric portions that damp crankshaft vibrations generated during firings events on an internal combustion engine. Said portion may comprise cooperating spaced inner and outer rings between which rings is contained an elastomeric damping material E, see FIG. 7.

Arcuate lip 40 projects from surface 31 substantially in the same direction as portion 10. Lip 40 has an arcuate form that cooperatively engages a damper rim. Lip 40 is disposed on surface 30 in a location such that when in use the tool is positively held in place by the interaction of portion 10 and lip 40 with a damper web feature. This is due in part to a partial flexure of portion 10 which occurs in response to lip 40 being engaged with a damper web feature. Lip 40 has a radius that allows cooperative engagement of the tool with a damper web feature. Dampers having such a web feature are known in the art and are more fully described in FIG. 6.

Figure 2:
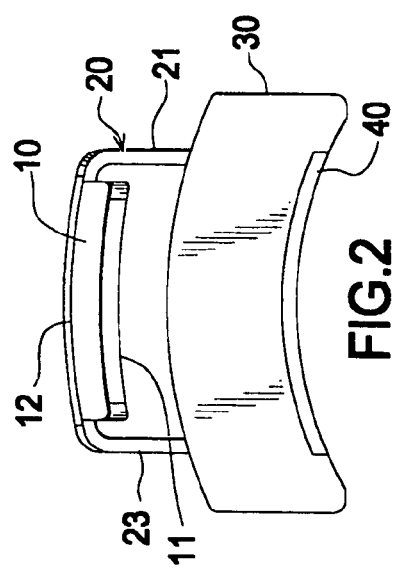
FIG. 2 is a rear elevation view of the tool.

FIG. 2 is a rear elevation view of the tool. Lip 40 and potion 10 each have an arcuate form to enhance engagement of the tool with a damper. Planar member 30 is of a size sufficient to stabilize the tool against a damper web feature.

Figure 3:
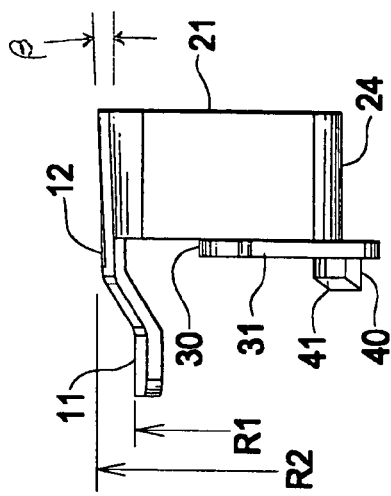
FIG. 3 is a side elevation view of the tool.

FIG. 3 is a side elevation view of the tool. Radius (R1) and (R2) are each determined with respect to a center of rotation of a damper on which the tool would be used. (R1) is less than (R2). Lip 40 comprises a chamfered surface 41. Surface 41 is disposed at an angle to surface 31 to facilitate easy engagement of lip 40 with a web feature. Further, portion 10 due to its cantilever design has some minimal but sufficient flexure when the tool is installed as lip 40 is pushed under a web feature to positively attach the tool to the damper. Radius (R1) is not equal to radius (R2).

Surface 12 is inclined toward portion 10 at an angle β. Angle β in the range of 0° to approximately 5°.

Figure 4:
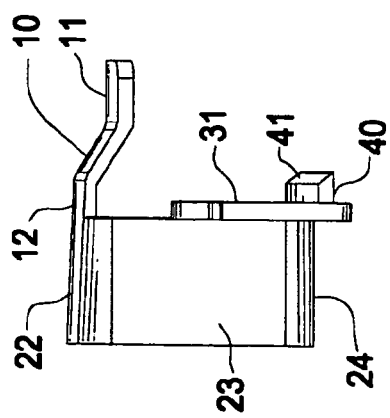
FIG. 4 is a left side elevation view of the tool.

FIG. 4 is a left side elevation view of the tool. The box-form of body 20 affords strength to the tool without unduly increasing weight and mass.

Figure 5:
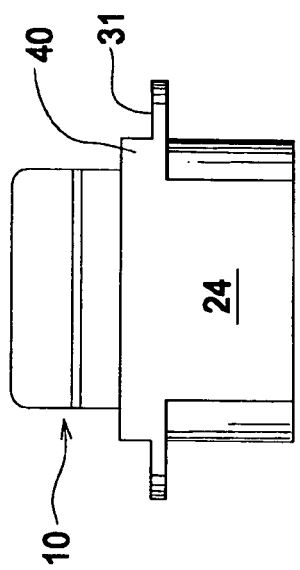
FIG. 5 is a bottom plan view of the tool.

FIG. 5 is a bottom plan view of the tool. Lip 40 and portion 10 are shown projecting in the same relative direction from body 20.

Figure 6:
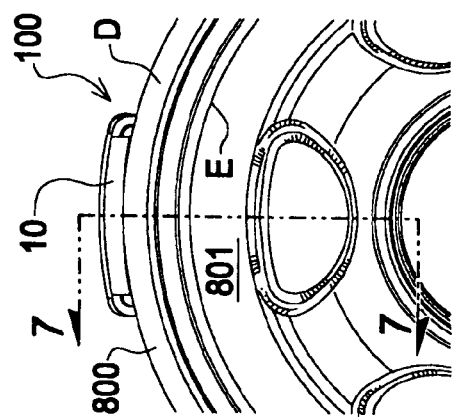
FIG. 6 is a side view of the tool in use on a damper.

FIG. 6 is a side view of the tool in use on a damper. The tool is used to install a belt on a damper D or other belt drive system pulley. A damper is known in the art for use on an engine crankshaft. The damper comprises an elastomeric portion E disposed between an outer ring 800 and inner ring 801. The elastomeric portion allows the damper to diminish or shift vibration peaks and speeds for a crankshaft system, thereby extending the operating life of the crankshaft and engine of which it is a part.

Figure 7:
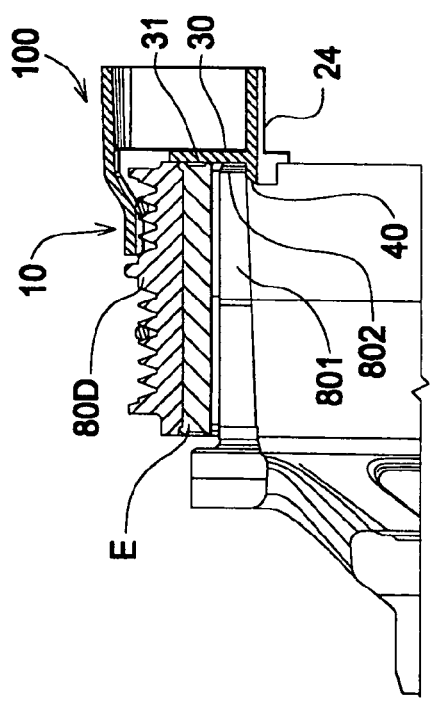
FIG. 7 is a cross-sectional view at line A-A in FIG. 6 of the tool in use on a damper.

FIG. 7 is a cross-sectional view at line A-A in FIG. 6 of the tool in use on a damper. Portion 10 of tool 100 is engaged with outer ring 800. Portion 10 in conjunction with lip 40 temporarily attaches the tool to the side of the damper. Support for the tool is realized by surface 31 pressing against an edge 802 of inner ring 801. Elastomeric portion E is disposed between ring 800 and ring 801.

Figure 8:
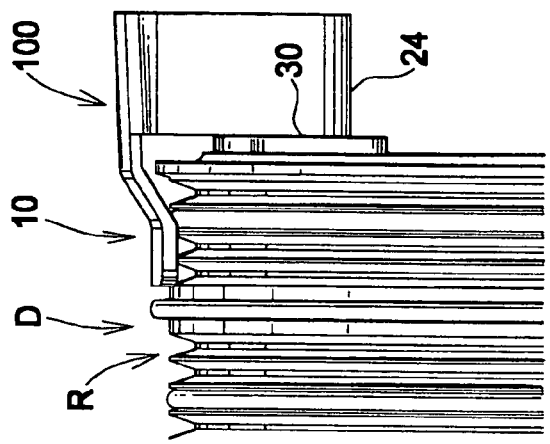
FIG. 8 is aside view of the tool in use on a damper.

FIG. 8 is aside view of the tool in use on a damper. The belt bearing surface is shown having ribs R for engaging a multi-ribbed belt (not shown).

Figure 9:
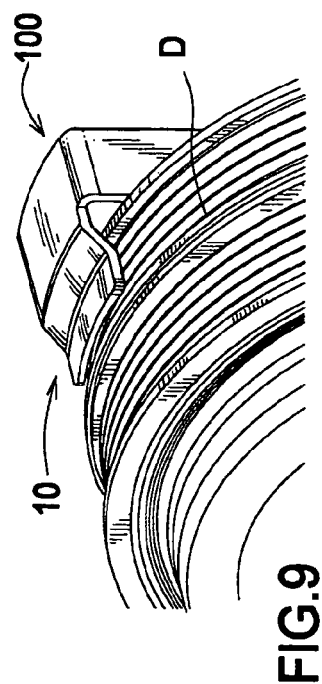
FIG. 9 is a perspective view of the tool in use on a damper.

FIG. 9 is a perspective view of the tool in use on a damper. Portion 10 engages the belt bearing surface or outer ring 800.

In use, a belt (not shown) lays partially diagonally across surface 12 and portion 10 in a slack condition. In the slack condition the belt is also partially engaged with ribbed portion R. As the damper is rotated by known means such as by a wrench, air tool, or socket tool, the belt is urged over the pulley or damper rim and onto full engagement with ribbed portion R. The tool is then removed from the pulley or damper.

Although a single form of the invention has been described herein, it will be obvious to those skilled in the art that variations may be made in the construction and relation of parts without departing from the spirit and scope of the invention described herein.

We claim:

1. A belt installation tool comprising:
   a body;
   an angular member portion extending in a cantilever fashion from the body, the angular member having a flexure characteristic;
   a member disposed on the body having a surface disposed substantially normal to the angular member;
   an arcuate lip portion projecting from the surface in substantially the same direction as the angular member; and
   the arcuate lip and the angular member for cooperatively engaging a pulley or damper.

2. The belt installation tool as in claim 1, wherein the body further comprises a box-like form.

3. The belt installation tool as in claim 1, wherein the angular member portion further comprises a first and second arcuate surface.

4. The belt installation tool as in claim 1, wherein the arcuate lip further comprises a chamfered edge.

5. The belt installation tool as in claim 1, wherein the member is planar.

6. A belt installation tool comprising:
   a body;
   an angular member portion extending in a cantilever fashion from the body, the angular member having a flexure characteristic;
   an arcuate lip portion projecting from a side of the body in substantially the same direction as the angular member; and
   the arcuate lip and the angular member cooperatively engaging a damper.

7. The belt installation tool as in claim 6, wherein the body further comprises a box-like form.

8. The belt installation tool as in claim 6, wherein the angular member portion further comprises a first and second arcuate surface.

9. The belt installation tool as in claim 6, wherein the arcuate lip further comprises a chamfered edge.

10. The belt installation tool as in claim 6, further comprising:
    a planar member attached to the same side of the body as the arcuate lip, the planar member having a surface disposed substantially normally to the angular member.

11. A belt installation tool comprising:
    a body;
    an angular member portion extending in a cantilever fashion from the body, the angular member being flexible;
    a planar member on the body, the planar member having a surface disposed substantially normal to the angular member;
    an arcuate lip portion projecting from the surface in substantially the same direction as the angular member; and
    the arcuate lip having a chamfered edge.

12. The belt installation tool as in claim 11, wherein the angular member portion further comprises a first and second surface, each surface disposed at a radius from a damper center of rotation, the radii not being equal.

* * * * *